US007768736B2

(12) United States Patent
Belmont et al.

(10) Patent No.: US 7,768,736 B2
(45) Date of Patent: Aug. 3, 2010

(54) CERTIFYING WHILE SERVOWRITING MEDIA

(75) Inventors: Ken L. Belmont, Lyons, CO (US); Dan R. McLeran, Loveland, CO (US); Dave Scott Williamson, Loveland, CO (US); Mark Christian Roberts, Berthoud, CO (US); Gabor Szita, Newark, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 63 days.

(21) Appl. No.: 12/016,169

(22) Filed: Jan. 17, 2008

(65) Prior Publication Data

US 2008/0239535 A1 Oct. 2, 2008

Related U.S. Application Data

(60) Provisional application No. 60/921,147, filed on Mar. 30, 2007, provisional application No. 60/921,148, filed on Mar. 30, 2007, provisional application No. 60/921,233, filed on Mar. 30, 2007, provisional application No. 60/921,234, filed on Mar. 30, 2007, provisional application No. 60/921,235, filed on Mar. 30, 2007.

(51) Int. Cl.
*G11B 21/02* (2006.01)
*G11B 27/36* (2006.01)

(52) U.S. Cl. .......................................... 360/75; 360/31

(58) Field of Classification Search ...................... None
See application file for complete search history.

(56) References Cited

U.S. PATENT DOCUMENTS 5,247,254 A 9/1993 Huber
5,333,140 A * 7/1994 Moraru et al. .............. 714/719
5,423,111 A 6/1995 Mori
5,423,524 A 6/1995 Searle
5,563,746 A 10/1996 Bliss
5,682,274 A 10/1997 Brown
5,812,560 A * 9/1998 Yuki .......................... 714/719
6,058,335 A * 5/2000 Kim ........................... 700/108
6,061,200 A 5/2000 Shepherd
6,084,738 A 7/2000 Duffy
6,098,140 A 8/2000 Pecone
6,118,604 A 9/2000 Duffy
6,169,413 B1 * 1/2001 Paek et al. .................. 324/760
6,262,857 B1 7/2001 Hull
6,330,122 B1 12/2001 Chang
6,441,981 B1 8/2002 Cloke
6,552,535 B2 4/2003 Funaki
6,560,052 B2 5/2003 Ng
6,587,293 B1 7/2003 Ding
6,724,558 B2 4/2004 Bryant
6,738,205 B1 * 5/2004 Moran et al. .................. 360/17
6,765,744 B2 7/2004 Gomez
6,888,154 B2 5/2005 Pfeiffer
6,906,883 B2 6/2005 Chu
6,909,568 B2 6/2005 Fukushi
6,934,112 B2 8/2005 Ono
6,947,232 B2 * 9/2005 Lim et al. ..................... 360/31

(Continued)

*Primary Examiner*—K. Wong
(74) *Attorney, Agent, or Firm*—McCarthy Law Group

(57) ABSTRACT

Certifying a media while servowriting the media by formatting a full compliment of servo data in storage tracks of the media in a minimum number of passes per storage track while simultaneously performing a 100% media certification of the storage tracks during the minimum number of passes per storage track.

22 Claims, 13 Drawing Sheets

U.S. PATENT DOCUMENTS

| | | | | |
|---|---|---|---|---|
| 6,958,874 | B1 | 10/2005 | Gerrard | |
| 6,967,807 | B2 | 11/2005 | Settje | |
| 6,977,791 | B2 | 12/2005 | Zhu | |
| 7,012,773 | B2 | 3/2006 | Ashikaga | |
| 7,032,127 | B1 | 4/2006 | Egan | |
| 7,035,039 | B2 * | 4/2006 | Shitara et al. ........... | 360/77.07 |
| 7,133,228 | B2 | 11/2006 | Fung | |
| 7,170,703 | B1 | 1/2007 | Egan | |
| 7,173,785 | B2 | 2/2007 | Saikawa | |
| 7,187,148 | B2 | 3/2007 | Okita | |
| 7,293,226 | B2 | 11/2007 | Ro | |
| 7,349,172 | B2 | 3/2008 | McLeran | |
| 2003/0002190 | A1 | 1/2003 | Teo | |
| 2003/0123172 | A1 | 7/2003 | Zhu | |
| 2003/0182070 | A1 | 9/2003 | Zhu | |
| 2004/0100719 | A1 | 5/2004 | Wilson et al. | |
| 2004/0145825 | A1 | 7/2004 | Miles | |
| 2005/0195727 | A1 | 9/2005 | Ruden | |
| 2005/0244167 | A1 | 11/2005 | Liew | |
| 2005/0265487 | A1 | 12/2005 | Sou | |
| 2005/0265504 | A1 | 12/2005 | Robinson | |
| 2006/0119977 | A1 | 6/2006 | Zhu | |
| 2006/0187907 | A1 | 8/2006 | Kinsman | |
| 2006/0221488 | A1 | 10/2006 | Morales | |
| 2006/0268939 | A1 | 11/2006 | Dries | |
| 2007/0008643 | A1 | 1/2007 | Brady | |
| 2007/0064325 | A1 | 3/2007 | Bi | |

* cited by examiner

100
TIMING REFERENCE
178
CONTROLLER
176
PATTERN GEN. FINITE STATE MACHINE
221
PLL FREQUENCY SYNTHESIZER
210
SERIALIZER
223
186
188
HOST
174
USER DATA STREAM
200
SERVO DATA STREAM
202
198
MUX
204
182
$P_1$
$P_2$
$P_3$
$P_4$
$P_n$

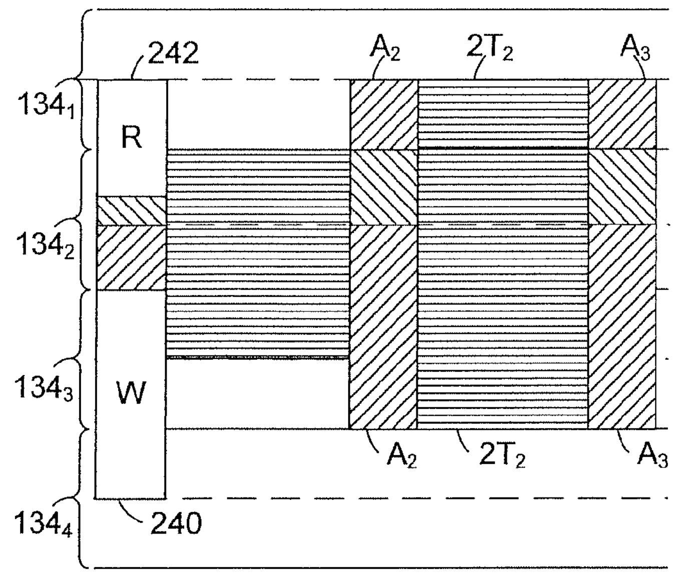
FIG. 20
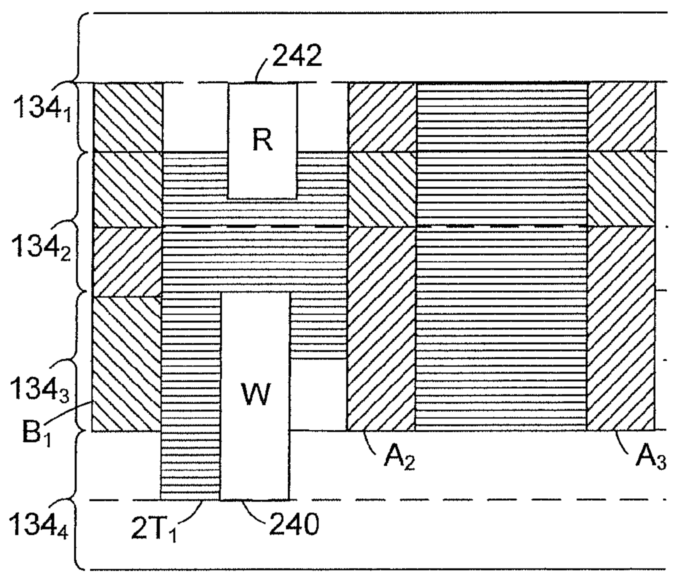
FIG. 21
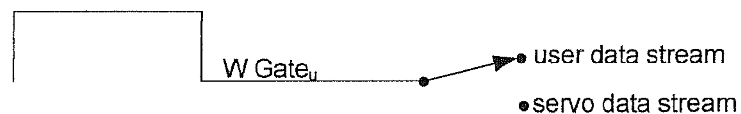

CERTIFYING WHILE SERVOWRITING MEDIA

RELATED APPLICATIONS

This application claims the benefit of priority to provisional applications 60/921,147, 60/921,148, 60/921,233, 60/921,234, and 60/921,235, all filed on Mar. 30, 2007.

BACKGROUND

Servo information is stored to media in a deliberate manner as part of the process of preparing the media for use in a data storage device. The servo information delineates the storage area in a data storage disc, for example, into addressable locations at the intersection of a designated radial position, such as track number, and a designated rotational position, such as sector number. Pluralities of discrete servo sectors form rings across the storage space, be they concentric or spiral rings. A data transfer element continuously feeds the servo information back to a servo control system as the element is moved about in the storage area. The control system utilizes the servo information to position the element, such as in deriving an optimal trajectory for moving the element to a desired track and maintaining the element at the desired track.

There are various ways to store servo information to the media. Generally, they can be broadly categorized as either an in-situ servowriting approach or an ex-situ servowriting approach, or a combination of the two approaches. In a disc drive, for example, in-situ approaches include storing servo data to the disc after it has been installed as a component part of the disc drive. The actuator in the disc drive is used to store the servo data to each disc. In some cases an external positioner engages the actuator and positionally controls it. In other cases seed data is first stored to the disc and the disc drive then executes programming instructions that propagate the servo data from the seed data (self-servo schemes).

Ex-situ approaches store some or all of the servo data to a disc before it is installed in the disc drive. Servowriters of this type typically employ an actuator supporting an element in a data storage relationship with the disc which is mounted on a rotating spindle, similar to the disc drive.

In addition to servowriting, media certification is also performed to ensure a requisite quality exists in the media's capability to store data and retain it. Generally, certification involves writing a preselected user data pattern in the storage area and then analyzing a readback signal for indications of flaws in the media. A flaw may exist because of nonconformities in the media, or may be due to a presence of contamination or debris. Screening the media for flaws before it escapes the factory or even reaches the finished goods is essential to building the expected quality and reliability into the storage devices.

Both servowriting and certification entail carrying out relatively long processes within what is a highly automated and fast paced manufacturing system. The claimed embodiments are directed to improvements in both the effectiveness and the efficiency with which the servowriting and certifying processes are performed.

SUMMARY

Certifying a media while servowriting the media by formatting a full complement of servo data in storage tracks of the media in a minimum number of passes per storage track while simultaneously performing a 100% media certification of the storage tracks during the minimum number of passes per storage track.

In some embodiments a method is provided including steps of: storing discrete sets of servo data with a write element at a first location of a media; and in intervals between adjacent sets of servo data being stored, performing one of: storing user data with the write element at the first location of the media; and retrieving user data with a read element, offset from the write element, at a second location of the media, wherein the user data at the second location was previously stored by the write element before repositioning the write element to the first location.

In some embodiments a method is provided including steps of: aligning a data transfer member to a first servo track in a first data track of a storage media; storing first servo bursts with the data transfer member in all servo wedges at the first data track during a first pass between the storage media and the data transfer member; aligning the data transfer member to a second servo track in the first data track; storing second servo bursts with the data transfer member in all the servo wedges at the first data track during a second pass between the storage media and the data transfer member; and retrieving user data with the data transfer member from all user data wedges at a second data track different than the first data track during the storing steps, the user data having been previously stored by the data transfer member.

In some embodiments a method is provided including steps of mounting a storage media and a data transfer member for selective movement with respect to each other in a data transfer relationship; and processing the storage media by steps for certifying while servowriting that interleave streams of servo data and user data and store the interleaved stream at a first location of the storage media, while retrieving previously stored user data from a second location of the storage media, wherein a full complement of the user data is retrieved from the second location within a timeframe during which a full complement of the servo data is stored to the first location in a minimum possible number of passes between the storage media and the data transfer member.

BRIEF DESCRIPTION OF THE DRAWINGS

FIGS. 16-23 diagrammatically depict a method of certifying media while servowriting to the media in accordance with embodiments of the present invention.

DETAILED DESCRIPTION

Figure 1:
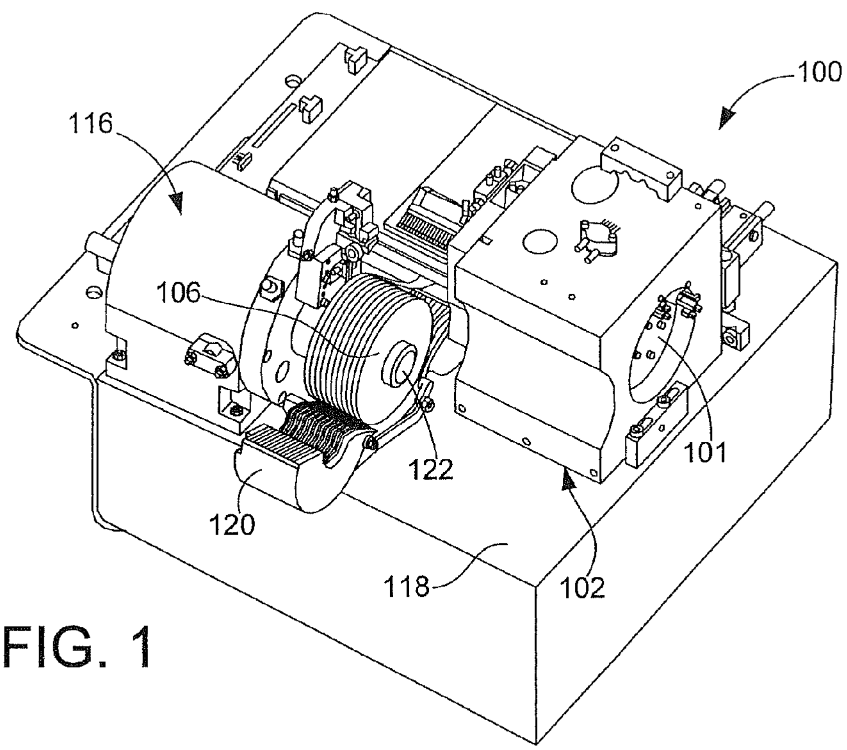
FIG. 1 is an isometric view of a media servowriter/certifier apparatus constructed in accordance with the claimed embodiments.
Figure 2:
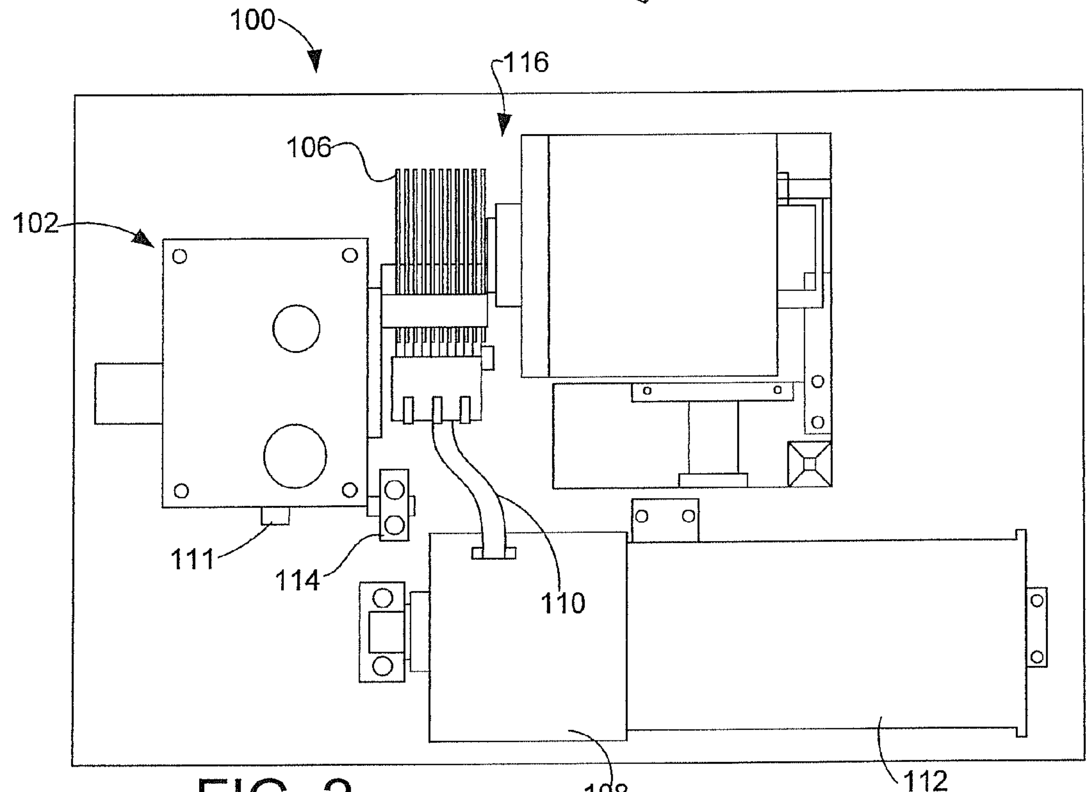
FIG. 2 is a plan view of the apparatus of FIG. 1.
Figure 3:
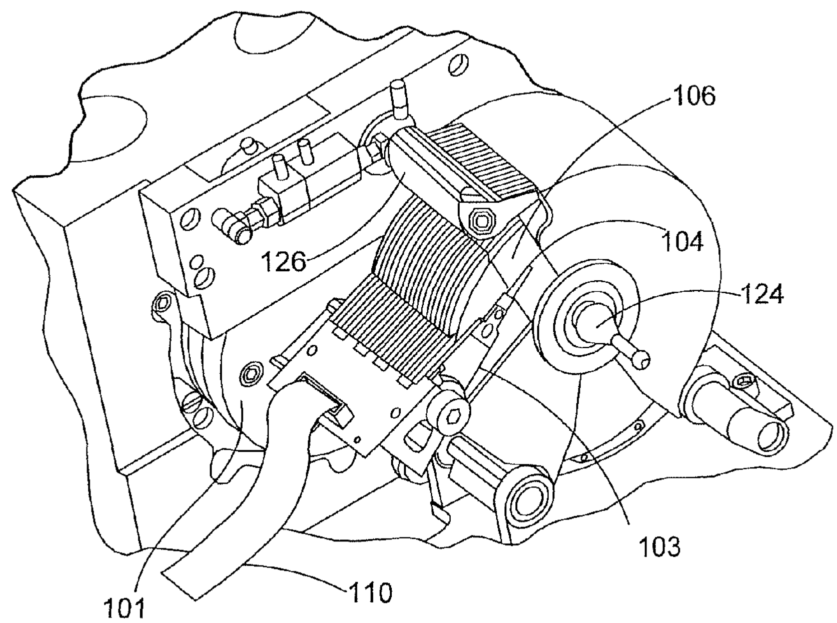
FIG. 3 is an isometric view of a portion of the apparatus of FIG. 1.

FIGS. 1-3 are views of a media servowriter/certifier apparatus 100 that is constructed in accordance with the claimed embodiments. Generally, an actuator assembly 102 has a motor 101 that rotatably positions an actuator 103 that, in turn, supports a plurality of data transfer elements 104, such as transducers, at a distal end thereof. Host access commands are executed by the apparatus 100 to simultaneously store data to and retrieve data from a plurality of data storage discs 106. Electronics controlling the functions of the apparatus 100 reside in a control board 108, and signals are communicated between the control board 108 and the transducers 104 by a printed circuit cable assembly 110.

The actuator assembly 102 has a base that is floatably supported upon a translational gas bearing (not depicted), and moved thereupon by a slide 111. A vacuum chuck 112 fixes the base at a desired location for precise lateral positioning of the transducers 104. A spindle assembly 116 presents the batch of discs 106 to the actuator assembly 102, rotating them in a data transfer relationship with the transducers 104. Note that in FIG. 3 the spindle assembly 116 is not shown for clarity sake. All these assemblies are supported upon a substantially immobile base 118 that is resistant to movement, such as a granite slab.

FIG. 1 depicts the apparatus 100 in a load/unload mode whereby the actuator assembly 102 is moved away from the spindle assembly 116 via the slide 111 and translational bearing, and a shroud 120 is pivoted away from an operable position where it partially encloses the discs 106. This permits unloading a batch of processed discs 106 from the spindle assembly 116, and then loading a next batch of discs 106 to be processed. Preferably, the discs 106 are supported on a removable hub having a clamp 122 at one end thereof for fixing the discs 106 in rotation, and having a quick connect feature 124 at the other end thereof for mounting the hub to the spindle assembly 116.

After the next batch of discs 106 is loaded to the spindle assembly 116, the apparatus 100 is returned to the operational mode depicted in FIG. 3. A comb 126 pivots toward the discs 106 to spreadingly engage the suspension members supporting the transducers 104, thereby creating a clearance between opposing transducers 104 sufficient for merging the discs 106 with the actuator 103. After merging, the comb 126 clearingly pivots away from the discs 106.

Servowriting then begins by spinning the discs 106 and rotating the actuator 103 to present the transducers 104 to various storage locations of the respective discs 106. The instantaneous lateral position of the transducers 104 is measured by an interferometer 114, which provides position signals to the control system controlling the motor 101 and the slide 111.

Figure 4:
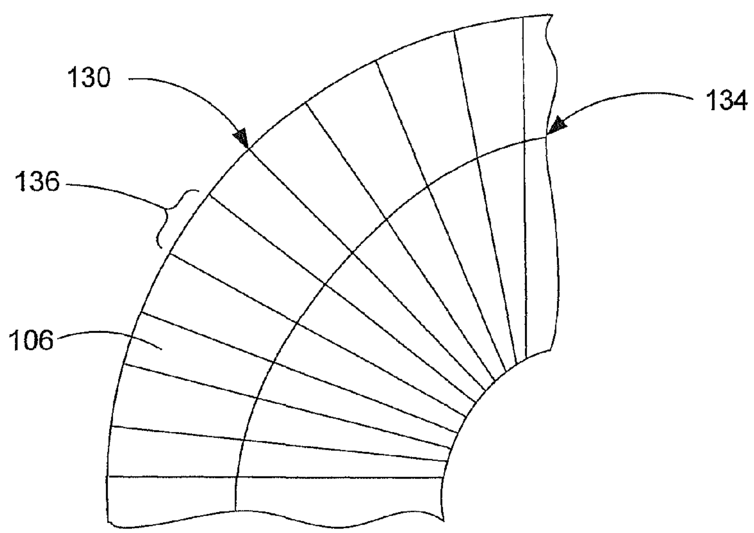
FIG. 4 is a diagrammatic depiction of a manner in which servo wedges and data wedges can be arranged on a disc.
Figure 5:
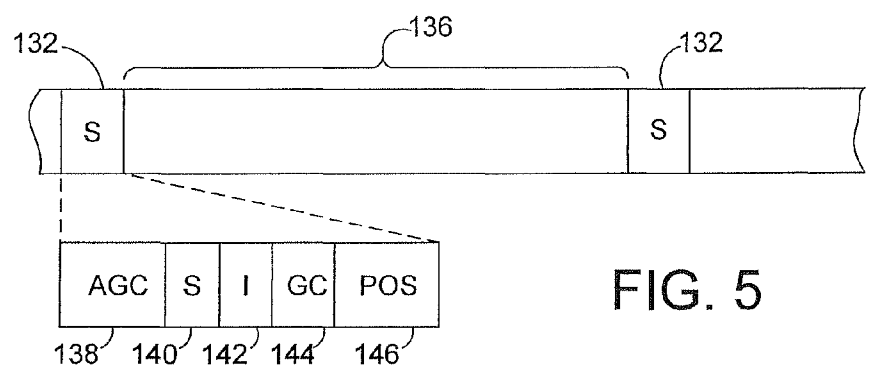
FIG. 5 is a diagrammatic depiction of an illustrative formatted servo sector.

FIGS. 4 and 5 generally depict a manner in which the servo data is arranged on the disc 106 by the servowriting. A number of servo data wedges 130 radially span the disc 106 like spokes in a wheel. Each servo wedge 130 is formed by storing a servo field 132 at each of a plurality of data tracks 134 (only one track 134 depicted), the tracks 134 being either concentric or spiral shaped data storage portions of the disc 106. The total number of servo wedges 130 per track 134 depends on the servo sampling rate of the device ultimately using the disc 106. Generally, the number varies from about 100 to 300 servo wedges 130 per data track 134.

User data wedges 136 are defined between adjacent pairs of the servo wedges 130. Preferably, the apparatus 100 formats only the servo wedges 130 during the servowriting process. That is, the user data wedges 136 remain in the form of unformatted data storage space between adjacent servo wedges 130. Ultimately, however, at a final formatting stage of the manufacturing process the user data wedges 136 are formatted as well to store user data in fixed size addressable blocks, such as 512 bytes each.

A general format of each servo field 132 includes an automatic gain control (AGC) field 138, a synchronization (S) field 140, an index (I) field 142, a Gray code (GC) field 144, and a position field (POS) 146. The AGC field 138 provides an oscillating preamble signal to prepare servo control circuitry for receipt of the remaining servo data. The synchronization field 140 signals the presence of a particular servo data wedge 130 by storing a unique synchronization pattern that is a selected Hamming distance away from other possible combinations of bit patterns on the disc. The index field 142 indicates angular position of the respective servo data wedge 130 on the disc 106 with respect to an index position, such as a baseline zero rotational degree reference. The Gray code field 144 provides a radial track address associated with the respective track 134, and the position field 146 includes servo burst patterns with seams defining servo track portions of each data track 134 that are used by the control system to detect intra-track location of the transducer 104.

Thus, during servowriting the apparatus 100 periodically stores discrete sets of servo data to the disc 106 at each track 134. As will be depicted and discussed further below, the transducer 104 has a write element that can store a wider magnetization pattern than the width of the data track 134. Thus, the entire servo field 132 except for the POS field 146 can be written during one pass of the disc 106, or in other words during only one revolution of the disc 106. The POS field 146 is made up of the servo burst patterns with seams that exist between the data track 134 boundaries, requiring a disc revolution to define each uniquely positioned servo burst seam. The description that follows depicts the use of an AB servo burst pattern, which at minimum requires two passes (revolutions) of the disc 106 to write all the POS fields 146 in each data track 134. The present embodiments are not so limited, however, such that in alternative embodiments other servo burst patterns can be employed, such as a quadrature servo burst pattern.

During the intervals that occur between adjacent servo wedges 130 being formatted, when the user data wedges 136 pass by the respective transducers 104, the apparatus 100 performs media certification processes. Ultimately, all of the user wedges 136 on the disc 106 are certified during the minimum cycle time required for writing all the servo wedges 130. That is, no additional cycle time need be allotted to media certification processes than that minimally required for servowriting, even though a 100% media certification is performed.

For media certification a reference data pattern, such as a 2T oscillating pattern, is stored to each user data wedge 136. Subsequently, a readback signal of the stored user data is analyzed to indicate any presence of flaws in the storage media. Consequently, during each interval between adjacent servo wedges 130 being stored, the transducers 104 either store user data to or retrieve a readback signal from a user data wedge 136. For purposes of this description and meaning of the appended claims, "user data" means generally a data pattern stored to the user data wedges 136 for the purpose of subsequently transducing a readback signal from it to scan the media for flaws. In some embodiments the user data can be no more than an oscillating pattern, while in alternative equivalent embodiments the user data can be an encoded data stream like that operably stored to the user data wedge 136 in the normal use of the disc drive.

Figure 6:
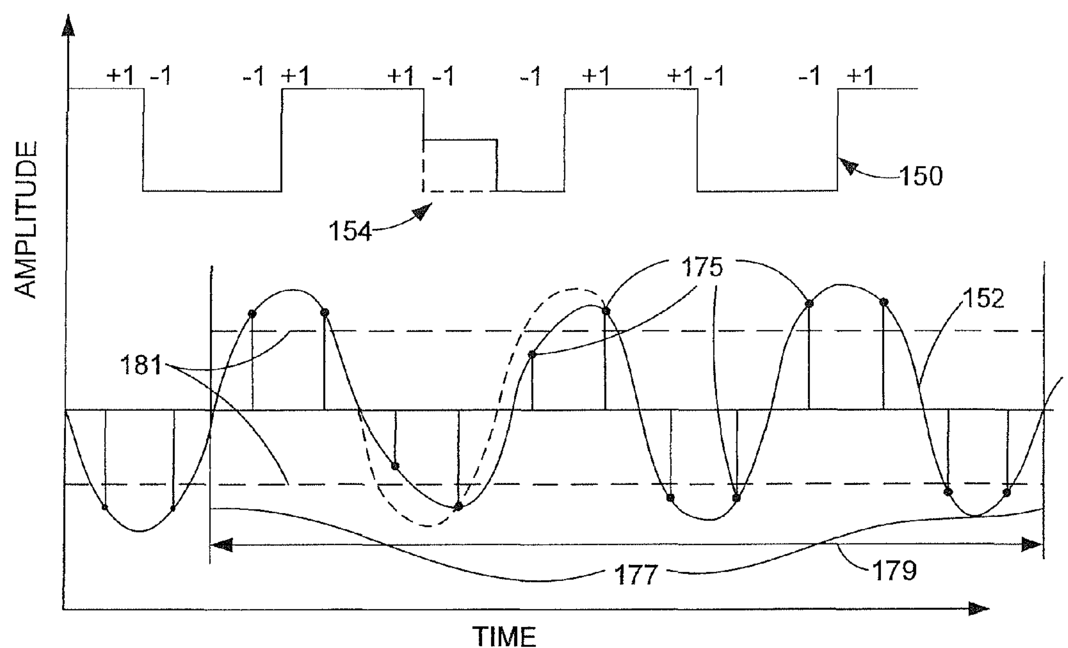
FIG. 6 graphically depicts a 2T oscillating reference waveform in NRZ format and a respective analog readback signal indicating a media flaw.

FIG. 6 graphically depicts a 2T pattern waveform 150 (in NRZ format) and a corresponding readback signal 152, both plotted against an elapsed time abscissa and an amplitude ordinate. Under expected conditions the 2T pattern will provide well behaved readback signal characteristics. However, the presence of a media flaw, such as indicated at 154, will result in a corresponding shift in the sample magnitude values of the readback signal 152. Thus, sampling of the readback signal 152 can provide indications that media flaws exist, as discussed in detail below.

Figure 7:
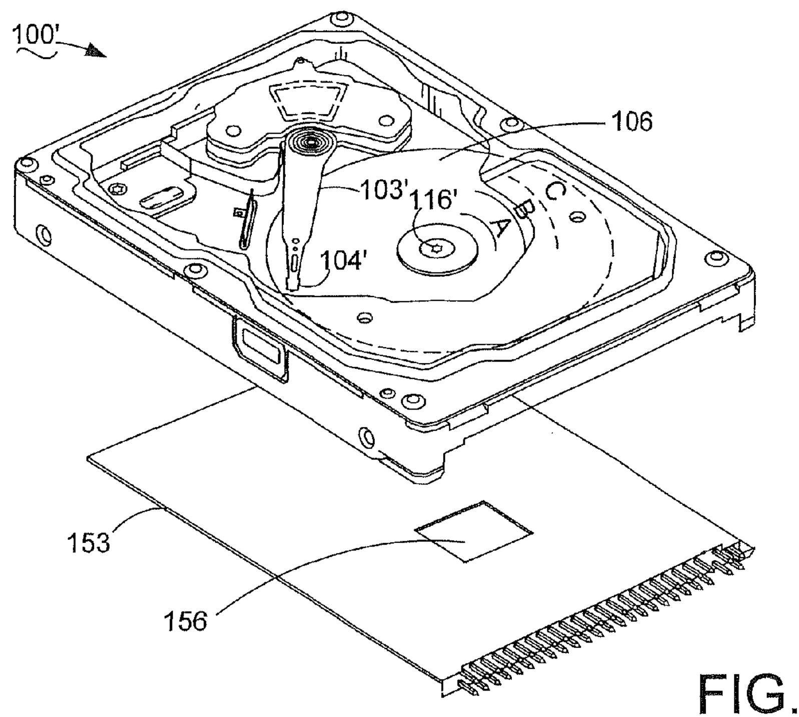
FIG. 7 is an isometric view of disc drive which has in-situ flaw scan processing capabilities.

FIG. 7 is a partially exploded isometric view of a data storage device 100' that uses data storage discs 106 after they are processed by the media servowriter/certifier 100. The data storage device 100' operates similarly to the media servowriter/certifier 100 to the extent that an actuator 103' supports transducers 104' in a data transfer relationship with the discs 106 as they are rotated by a motor 116'. A printed circuit board 153 contains electronics components and circuitry that control the functions of the data storage device 100'. One of the components shown diagrammatically is a read/write channel chip 156.

Figure 8:
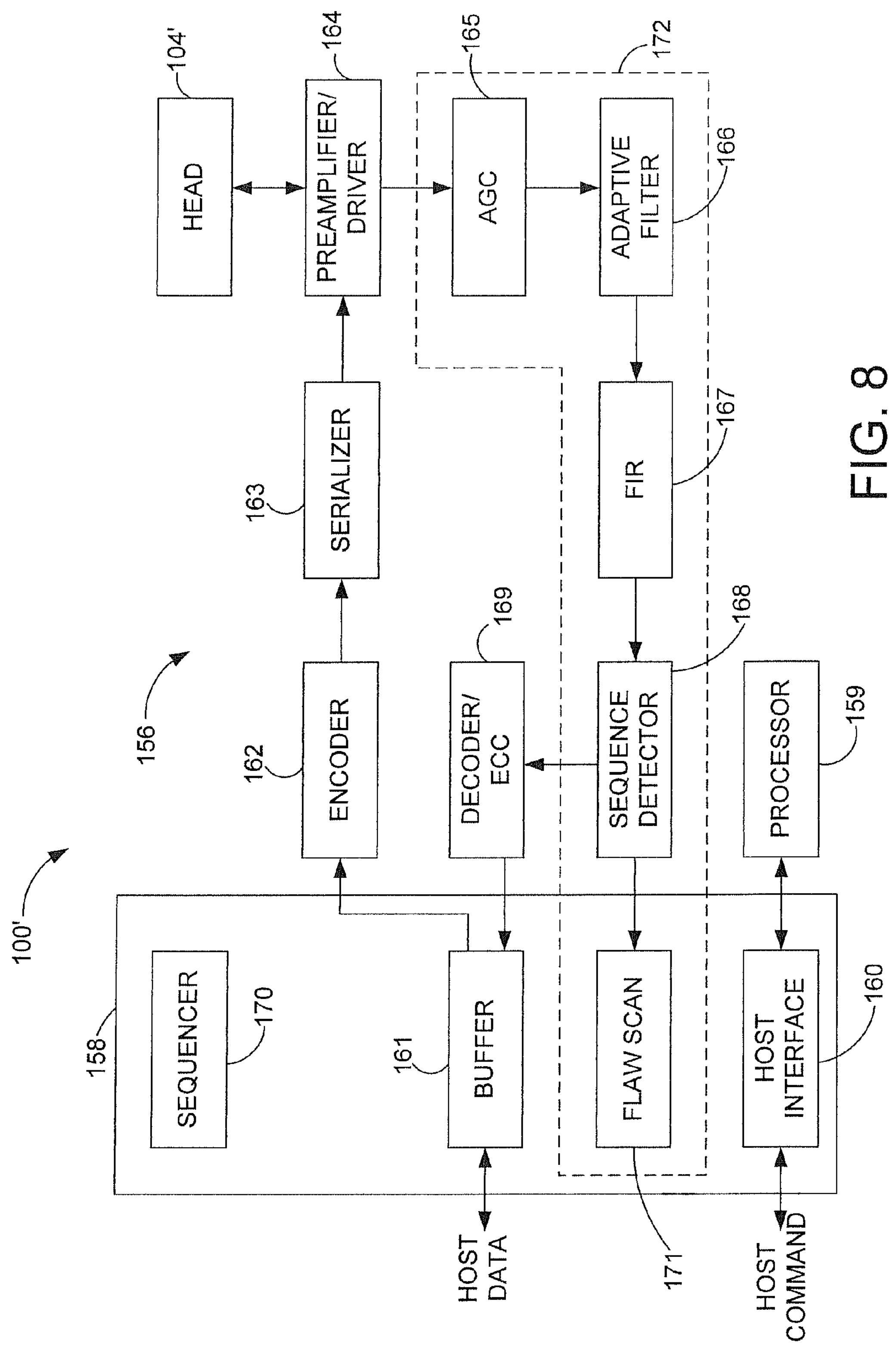
FIG. 8 is a functional block diagram of the read/write channel of the disc drive of FIG. 7.

FIG. 8 depicts a functional block diagram of relevant circuitry of the data storage device 100' of FIG. 7, including an interface 158 in communication with the read/write channel 156 (FIG. 7). The interface 158 communicates with a host device in accordance with an industry standard protocol. A processor 159 provides top level control of the data storage device 100'. The read/write channel 156 operates to store data to the discs 106 and to retrieve previously stored data from the discs 106. For reference purposes in this description the read channel portion 172 of the read/write channel 156 is contemplated as using partial response, maximum likelihood (PRML) detection, although such is not limiting of the scope of the claimed embodiments.

During a data write operation, the host provides a write command to a host interface circuit 160 of the interface 158 and loads the data to be written to a data buffer 161. The data are encoded by an encoder circuit 162 to provide run length limited (RLL) and error correction encoding, and the encoded data are serialized by a serializer 163. The output of the serializer 163 constitutes a non-return to zero (NRZ) signal used by a preamplifier 164 to apply bi-directional write currents to the selected transducer 104' to write the data as a sequence of magnetic flux transitions on the disc 106.

During a subsequent data read operation, the data are transduced from the disc 106 by the read channel portion 172 of the read/write channel 156. The transducer 104' provides a readback signal that is preamplified by the preamplifier 164, normalized by an AGC circuit 165 and filtered by an adaptive filter 166. The filtered signal undergoes time-domain filtering to a selected class of partial response waveforms (e.g., EPR4) by a finite impulse response (FIR) filter 167. A sequence (Viterbi) detector 168 samples the output of the FIR 167 to provide a sequence of data values representative of the encoded data written to the disc 106.

A decoder 169 removes the RLL encoding and applies on-the-fly error detection and correction to provide the recovered user data to the buffer 161 for subsequent transfer to the host. A sequencer 170 asserts read and write gate signals to control the writing and reading of data by the read/write channel 156.

A flaw scan controller 171 can be included in the read channel 172 to monitor the output of the sequence detector 168 for indications of media flaws, such as shown at 154 in FIG. 6, through the application of appropriate thresholds to the sample values Output from the sequence detector 168.

For example, FIG. 6 depicts a monitoring window 177 on the readback signal 152 having a length 179 of n peak to peak cycles; in this illustrative case n=3 cycles. The flaw scan controller 171 defines a flaw in terms of m/n exceeding a predetermined ratio, where m is a number of sampling values 175 in the window 177 that are less than a predetermined threshold value 181. In the illustration of FIG. 6, m is equal to two. The flaw scan controller 171 also stores the flaw location by correlating the flaw with its respective track 134 and preceding servo field 132 from the GC field 144 (FIG. 5) and I field 142, respectively.

Note that in these illustrative embodiments the read channel 172 does not include decoder circuitry because the certification (user) data is preferably in the form of an oscillating 2T waveform. This is not limiting of the scope of the contemplated embodiments because in alternative equivalent embodiments a decoder would be included in the read channel 172 in conjunction with the use of an encoded user data stream for the certification data.

Figure 9:
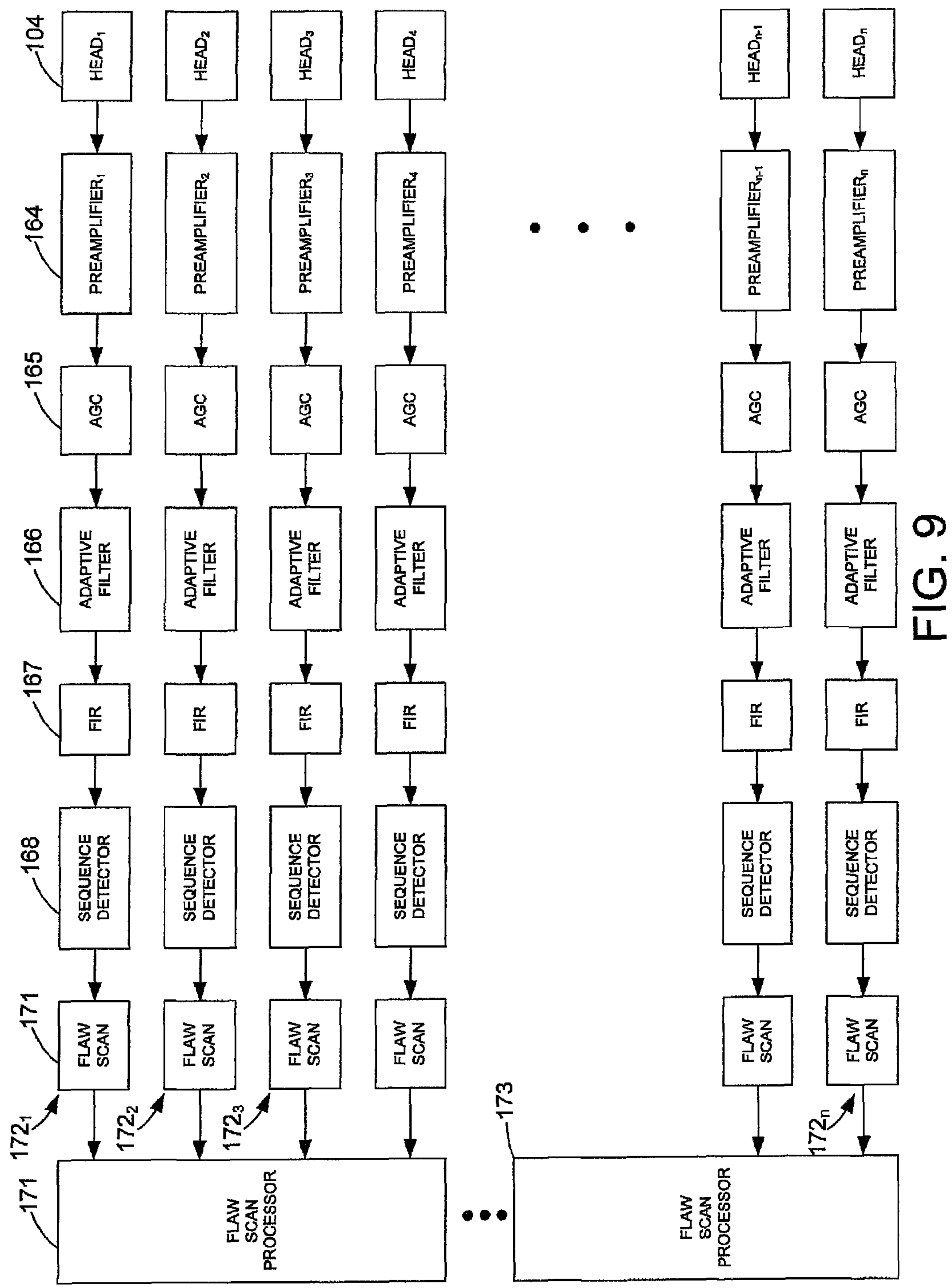
FIG. 9 is a functional block diagram of the plurality of dedicated read channels in the media servowriter/certifier apparatus of FIG. 1.

FIG. 9 depicts a plurality of the same read channel $\mathbf{172}_1$, $\mathbf{172}_2$, $\mathbf{172}_3$, . . . $\mathbf{172}_n$ can be used in the media servowriter/certifier apparatus 100 to process discs 106 that will ultimately be used in the data storage device 100'. Matching the read channel 172 parameters in the media servowriter/certifier apparatus 100 to the read channel 172 parameters of the data storage device 100' ultimately using the discs 106 provides an ex-situ media certification that most closely simulates testing the discs 106 as if they were actually installed in the data storage device 100'.

Figure 10:
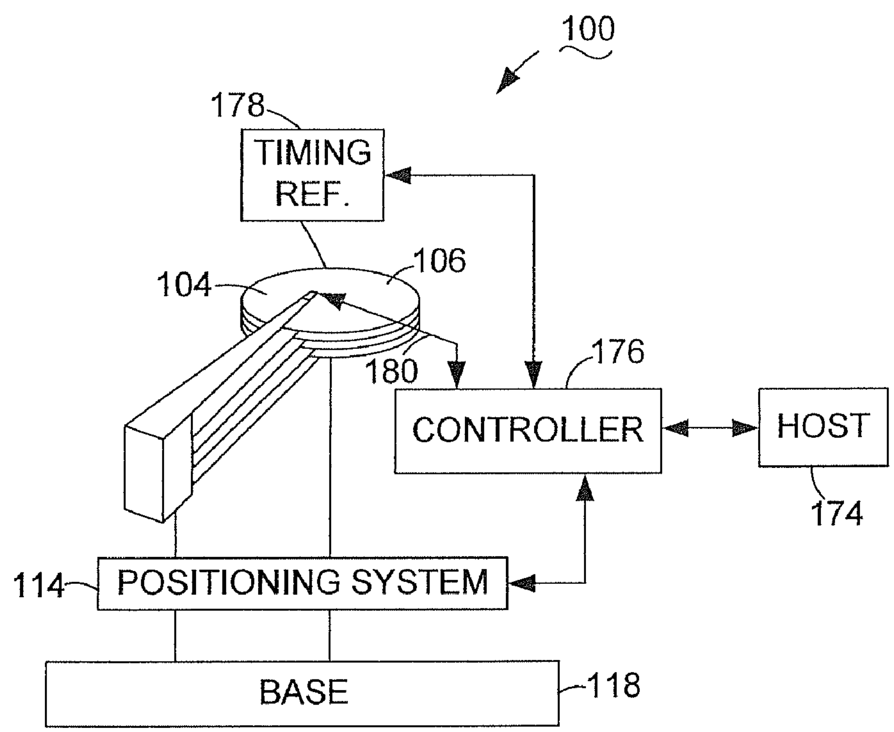
FIG. 10 is a generalized functional depiction of the media servowriter/certifier apparatus of FIG. 1.

FIG. 10 is a diagrammatic depiction of the media servowriter/certifier apparatus 100 contemplated by the present embodiments. An external host 174 communicates with a top level controller 176 which, in turn, controls and coordinates activities of the various systems. For instance, the base 118 (FIG. 1) supports a positioning system such as including the interferometer 114 (FIG. 2) that provides measurements in a closed control loop by which the controller 176 responsively controls the position and movement of the transducers 104 and the rotation of the stack of discs 106. A timing reference 178 acquires phase lock with the rotating discs 106 in order to inform the controller 176 of their rotational position. The controller 176 asserts various read gates and write gates on a communication channel 180 in relation to the timing reference 178 in order to send a write signal simultaneously to each of all of the transducers 104, and to transduce a readback signal simultaneously from each of all the transducers 104.

Figure 11:
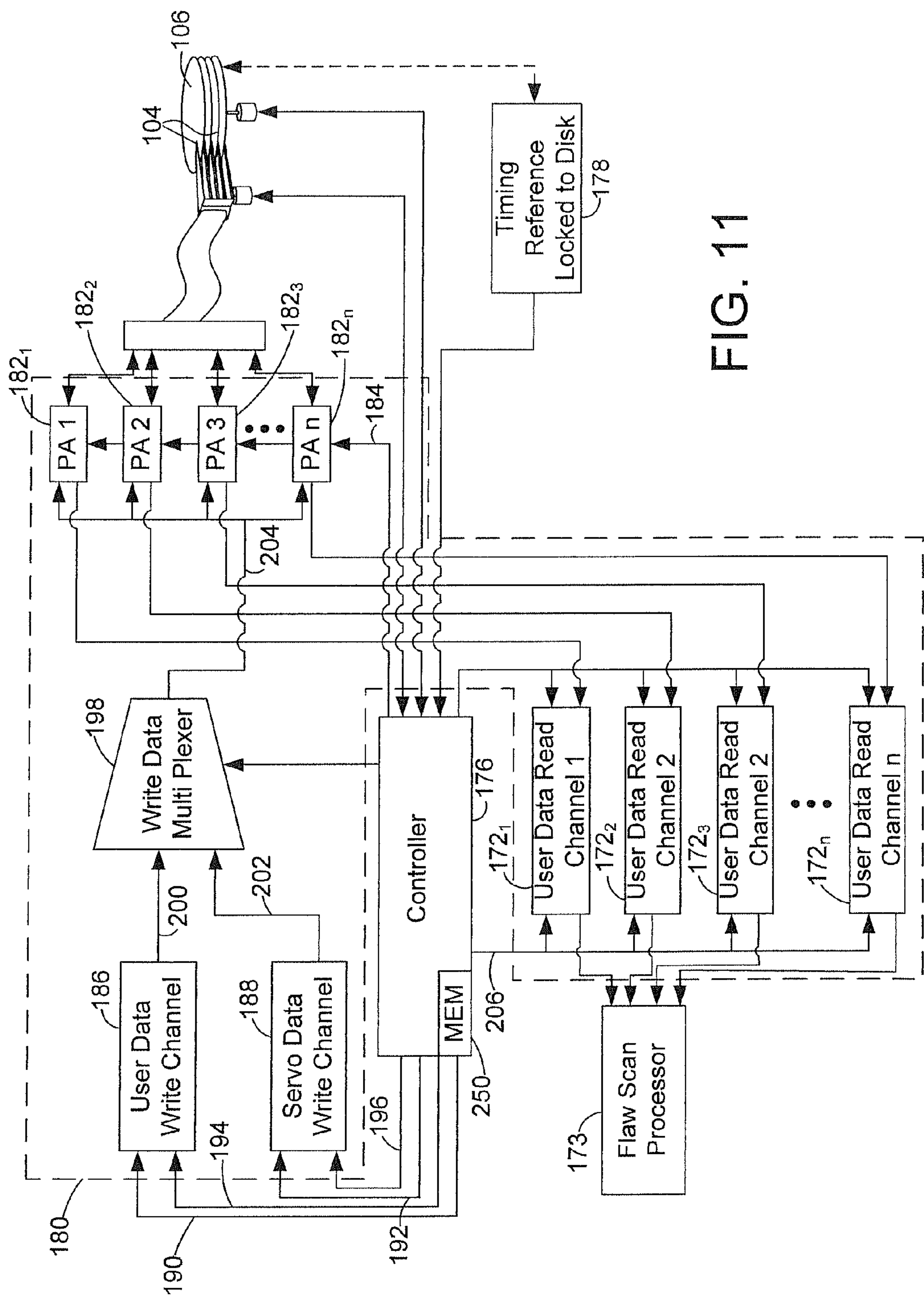
FIG. 11 is a diagrammatic depiction of the communication bus of the media servowriter/certifier depicted in FIG. 10.

FIG. 11 diagrammatically depicts a communication channel 180 constructed in accordance with embodiments of the present invention. Again, the top level controller 176 controls the operations of a number of components in the communication channel 180 in relation to the timing reference 178 in order to maintain phase coherency amongst the data being stored and retrieved.

A dedicated preamplifier 182 exists for each transducer 104. The controller 176 is responsive to the timing reference 178 in asserting a read/write gate on the plurality of preamplifiers 182 via path 184. The controller 176 likewise asserts write gates on each of a user data write channel 186 and a servo data write channel 188 via path 190 and path 192, respectively. The timings of the write gates in these channels are synchronized to the rotation of the discs via write time reference signals provided via paths 194 and 196, respectively.

A multiplexer 198 receives inputs in the form of a user data stream 200 and a servo data stream 202 from the respective write channels 186, 188. The multiplexer 198 outputs a write signal simultaneously to all of the preamplifiers 182 via path 204.

For retrieving readback signals, the controller 176 asserts read gates on a plurality of dedicated read channels $172_1$, $172_2$, $172_3$, . . . $172_n$ via path 206, there being a dedicated read channel 172 associated with each preamplifier 182. As previously discussed, each read channel 172 preferably matches the characteristic normalization and time domain filtering parameters of the data storage device 100' (FIG. 7) ultimately using the media 106. The read channel 172 samples the output of the filtered readback signal to provide a sequence of data values representative of the data written to the media 106. The read channel 172 also has flaw scan capabilities, whereby the sampled data is compared to predetermined threshold values to indicate the presence of a media flaw, such as shown in the amplitude modulation in FIG. 6 corresponding to the flaw 154.

By providing a dedicated read channel 172 for each transducer 104, the communication channel 180 is capable of simultaneously processing readback signals from each of the media. Although not limiting of the claimed embodiments, during reduction to practice as many as thirty-two dedicated read channels 172 were successfully used to simultaneously process respective readback signals for media flaws.

Preferably, in order to reduce processing overhead, the controller 176 only outputs actual indications of flaws to a flaw scan processor 173. In the illustrative embodiments of FIGS. 9 and 11 each flaw scan processor 173 handles the outputs of four read channels 172, but the present embodiments are not so limited. The flaw scan processor 173 makes qualitative judgments of the media 106 based on predetermined metrics, such as in relation to a threshold total number of flaws and/or a number of adjacent "scratches" and the like.

Figure 12:
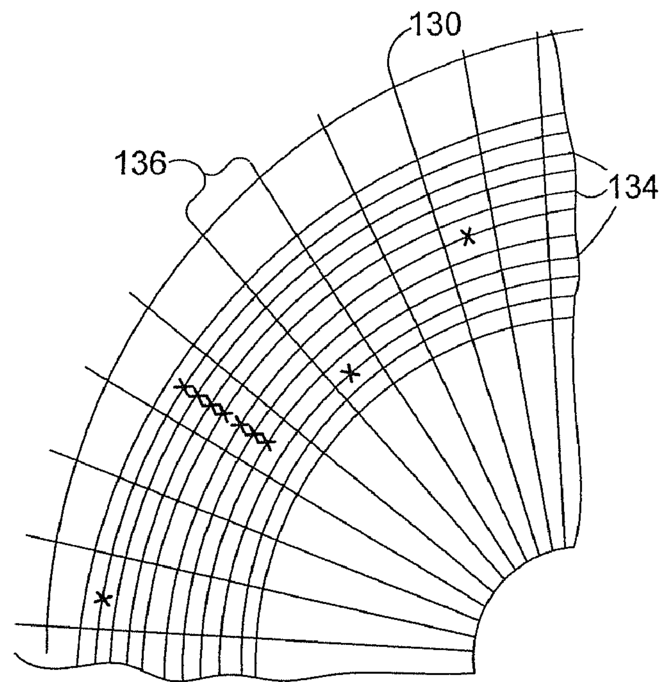
FIGS. 12 and 13 depict tabulated results of the flaw scan processing capability of the media servowriter/certifier depicted in FIG. 10.
Figure 13:
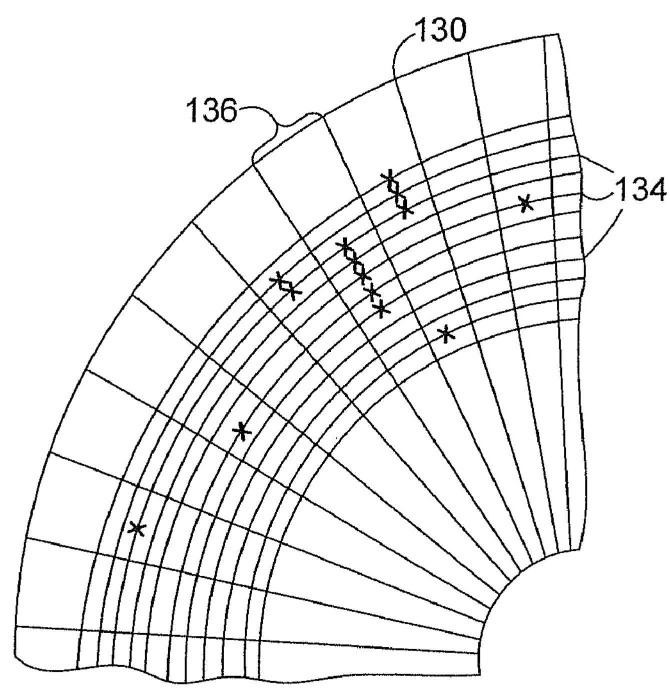

A "scratch" is indicated where flaws are detected in consecutive tracks of the same user data wedge 136. FIGS. 12 and 13 depict two illustrative criteria that can be used to qualitatively judge the media in relation to indicated flaws. Note that the spacing between adjacent tracks 134 in FIGS. 12 and 13 is greatly exaggerated for illustration purposes. FIG. 12 depicts data tabulated by the flaw scan processor 173 indicating a scratch exists because flaws were detected in seven consecutive tracks 134 and within the same user data wedge 136. The media 106 will be judged to be nonconforming and thereby screened out of the production flow if the threshold maximum length for a scratch is set to less than seven data tracks. FIG. 13 depicts tabulated data indicating that three scratches involving at least one common track 134 were indicated in adjacent user data wedges 136. Similarly, the media 106 will be judged nonconforming if the threshold maximum number of adjacent overlapping scratches is set to less than three.

The discussion of servowriting so far has referenced only the ex-situ media servowriter/certifier apparatus 100. However, the present embodiments are not so limited. That is, in equivalent alternative embodiments the servowriting and certifying can be an in-situ process performed on the discs 106 after they have been installed into the disc drive 100' depicted in FIG. 7. This can be accomplished either by using a servo track writer that positionally controls the actuator 103', or by self servo control schemes. For purposes of the present description and meaning of the appended claims, therefore, the present embodiments contemplate an apparatus and associated method adapted for either ex-situ or in-situ servowriting and certifying, or a combination of both.

With continued reference to the data storage device 100' of FIG. 7, the disc 106 is depicted as being divided into three radial zones A, B, and C. The bit density with which data is stored to the data storage device 100' is preferably greater at outer tracks, such as in zone C, in comparison to inner tracks, such as in zone A. However, with different bit densities used in the end product, choosing what bit density to use in media certification can be problematic. Certifying with a bit density that is different than what the disc drive 100' uses can give a false indication of disc quality with respect to the media's actual performance in the end product.

Figure 14:
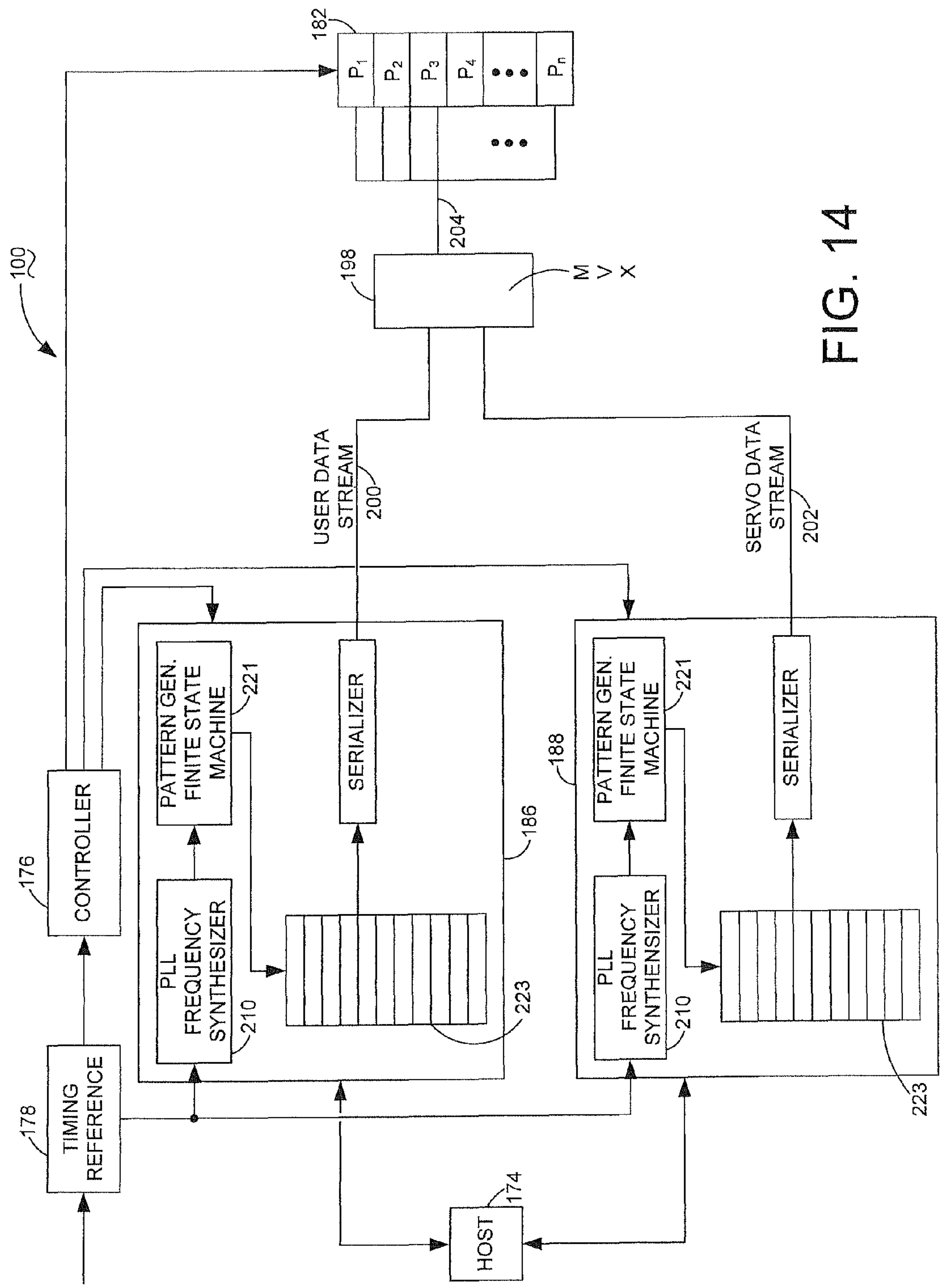
FIG. 14 is a functional block depiction of a user data write channel and a servo data write channel that are capable of a varying the bit stream density.

The present embodiments solve this problem by providing the communication channel 156 with the capability of varying the write signal 204 (FIG. 11) to the transducers 104 to store data at a selected one of a plurality of different bit densities. FIG. 14 diagrammatically depicts how the dual write streams 200, 202 can vary with respect to a commanded data transfer rate. The user and servo write channels 186, 188 are preferably embodied as an integrated circuit in the form of a FPGA or an ASIC. Each channel 186, 188 receives the timing reference 178 and write gate control via the controller 176. The channels 186, 188 also receive commanded data transfer rate(s) from the host 174. Preferably, the host 174 commands the transfer rates to match the characteristic bit densities with which the end product stores data. For example, the host would command three different transfer rates commensurate with the three zones (A, B, and C) in the data storage device 100' of FIG. 7. Zone transitions are loaded by the host 174 in terms of servo counts at which to shift the transfer rate.

In the illustrative embodiments each channel 186, 188 has a phase lock loop frequency synthesizer 210 for providing the respective data streams 200, 202 at a desired transfer rate. A pattern generator 221, such as embodied as a finite state machine, loads bit patterns to a pattern buffer 223. The bit patterns are then serialized and interleaved by the multiplexer 198 to provide the write signal 204 to all the preamplifiers 182 simultaneously.

Figure 15:
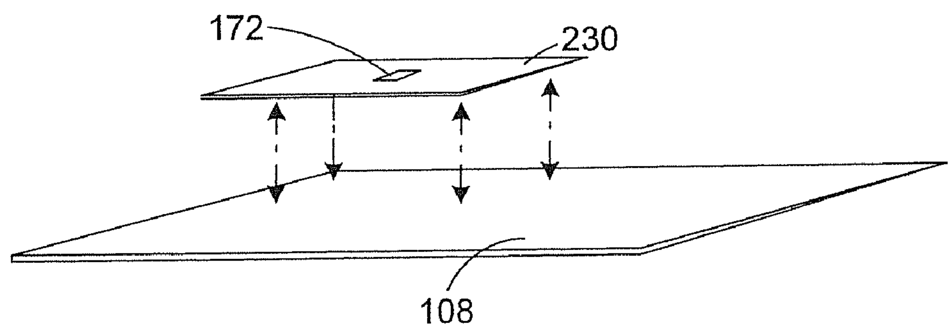
FIG. 15 diagrammatically depicts a desired read channel being made part of a daughter card that is plugged into the media servowriter/certifier control board.

Flexibility in changing over is required in order to match the read channel 172 parameters in the media servowriter/certifier apparatus 100 to that of the read channel parameters of the data storage device 100' that will ultimately use the discs 106. In some embodiments the read channel 172 can be reconfigured by execution of software routines adapted to that purpose. In other embodiments FIG. 15 diagrammatically depicts the read channel 172 being provided as an integrated circuit on a daughter card 230 that is swappable on the control board 108 (FIG. 2).

Figure 16:
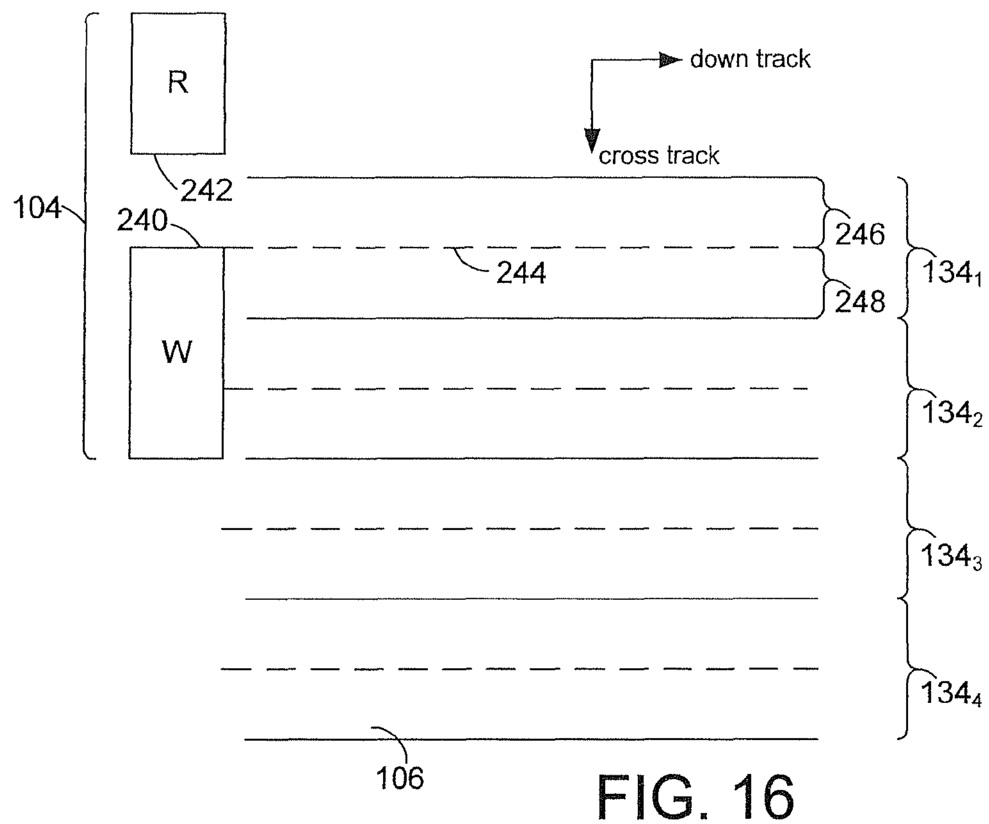

Turning now to FIGS. 16-23, which describe steps in an illustrative method for certifying media while servowriting to the media in accordance with the claimed embodiments. FIG. 16 depicts a portion of four adjacent data tracks 134.sub.1, 134.sub.2, 134.sub.3, 134.sub.4 repeatedly used in the FIGS. that follow as the disc 106 makes sequential passes, or revolutions, with respect to the transducer 104. As indicated by the down track direction arrow, the disc 106 in these FIGS. is rotating counter-clockwise. As indicated by the cross track direction arrow, the transducer 104 indexes to the next data track 134 in a downward direction after storing a full complement of servo data to a particular data track 134.

The transducer 104 has a write element 240 and a read element 242 that are offset from each other in the cross track direction. Preferably, the offset is on the order of about twenty data tracks 134. The much smaller offset in FIGS. 16-23 is solely diagrammatic in nature for the purpose of simplifying the illustrations for clarity sake. These illustrative FIGS. in no way define or limit the contemplated embodiments to the offset depicted.

The effective width of the write element 240 is depicted as being one and one-half data tracks wide, and the read element 242 is depicted as being about three-quarters of the data track width. These sizes, too, are illustrative and not limiting of the present embodiments, although preferably the write element 240 is wider than the data tracks 134 and the read element 242 is narrower than the data tracks 134.

In FIG. 16 the trailing edge (with respect to cross track direction) of the write element 240 is aligned with a servo burst seam 244 that lies between the dibit patterns of the POS field 146 (FIG. 5) portion of the servo data. The opposing boundaries of the data track 134, and the servo burst seam 244 define servo data tracks 246, 248 within data track $134_1$.

Figure 17:
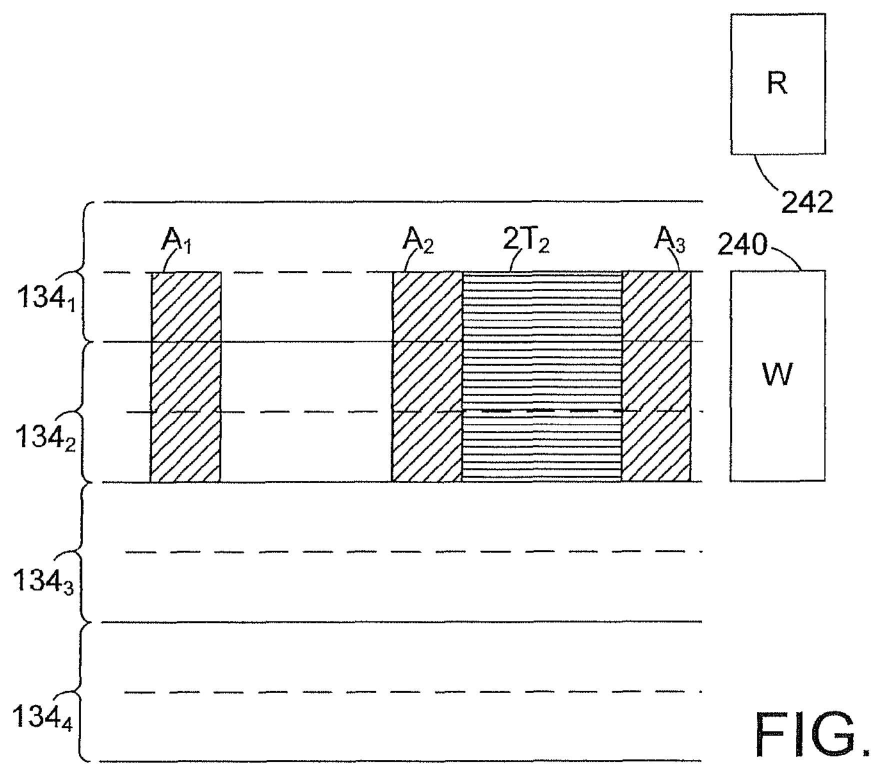

FIG. 17 shows the transducer 104 having traversed this portion of the disc 106 during a first pass (revolution) of the disc 106. During the first pass the write element 240 stores servo bursts of a first polarity ("A bursts") $A_1$, $A_2$, $A_3$ within each of the respective servo wedges 130 (FIG. 5) in track $134_1$. It is understood that the write element 240 also writes the rest of the servo data (FIG. 5; AGC field 138, S field 140, I field 142, and GC field 144) to each servo wedge 130 as well, but only the servo burst portions of the POS field 146 are depicted here for simplifying the diagrammatic illustrations. It will also be understood that because the write element 240 is wider than the data tracks 134, the other fields of the servo data that are not depicted in these illustrations can be written during one pass of the disc 106, or alternatively they could be stitched together in two passes.

A predetermined user data pattern, such as the oscillating 2T pattern depicted as $2T_2$, is also stored by the write element 240 within the user data wedge 136 between the $A_2$ and $A_3$ servo bursts during the first pass. This pattern of writing the 2T data to alternating user data wedges 136 is repeated for the entire track $134_1$. That is, the 2T pattern is written between alternating bursts such as between $A_2$&$A_3$, between $A_4$&$A_5$, between $A_6$&$A_7$, . . . and between $A_{2n}$,&$A_{2n+1}$ where n=1 to the number of servo wedges 130 in the entire track $134_1$.

Figure 18:
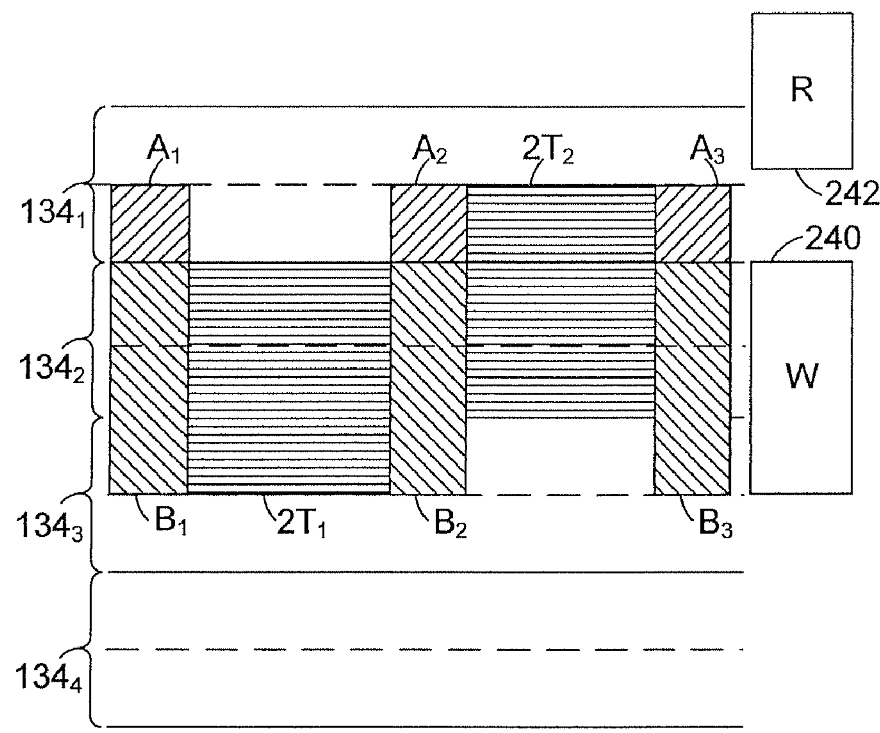

FIG. 18 depicts the transducer 104 having indexed one servo track in the cross track direction and there traversed this portion of the disc 106 during a second pass. Servo bursts of an opposite polarity ("B bursts") are written to each of the servo wedges 130, trimming the previously written A bursts to align the AB seam at the boundary between data track $134_1$ and data track $134_2$. The 2T data is also written in the user data wedges 136, but in an opposite pattern to the pattern in the first pass. That is, during this second pass the 2T pattern is stored between $B_1$&$B_2$, between $B_3$&$B_4$, between $B_5$& $B_6$, . . . and between $B_{(2n-1)}$&$B_{2n}$.

Figure 19:
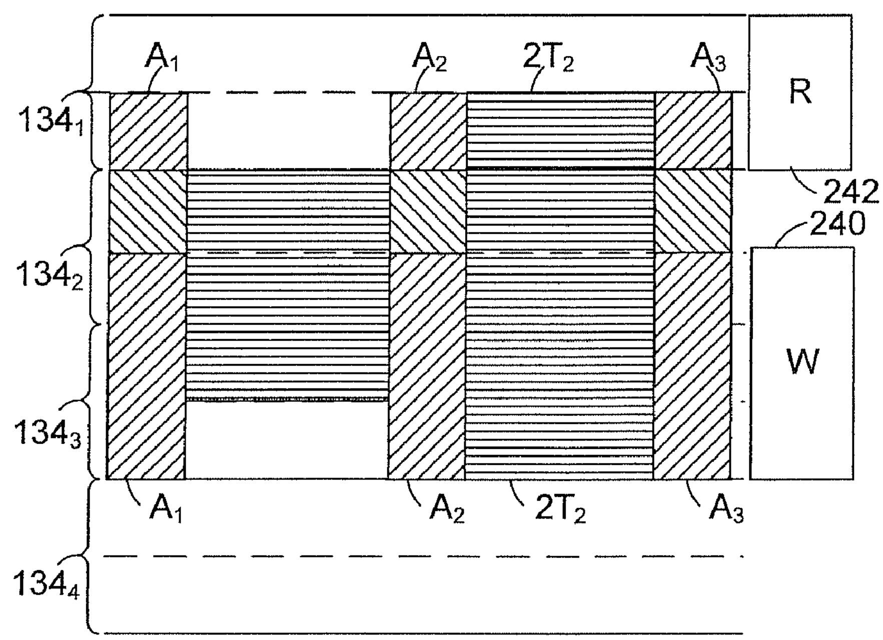

FIG. 19 depicts the transducer 104 having indexed another servo track in the cross track direction and there traversed this portion of the disc 106 during a third pass. The write element 240 repeats the pattern previously stored during the first pass in FIG. 17, storing servo bursts $A_1$, $A_2$, $A_3$ . . . An and storing the 2T pattern between $A_2$&$A_3$ . . . $A_{2n}$&$A_{2n+1}$.

FIG. 20 depicts the transducer 104 having indexed another servo track in the cross track direction and there disposed at the first of the three servo wedges 130 during a fourth pass of the disc 106. The controller 176 (FIGS. 10 & 11) asserts a write gate on the servo write channel 188 to produce a servo data stream through the multiplexer 198 and to each of the write elements 240 to store the $B_1$ servo burst.

In FIG. 21 the disc 106 has rotated during the fourth pass to where the transducer 104 is disposed at the first of the two user data wedges 136. The controller 176 now asserts a write gate on the user data write channel 186 to produce the 2T pattern through the multiplexer 198 and to each of the write elements 240 to store the $2T_1$ pattern.

Figure 22:
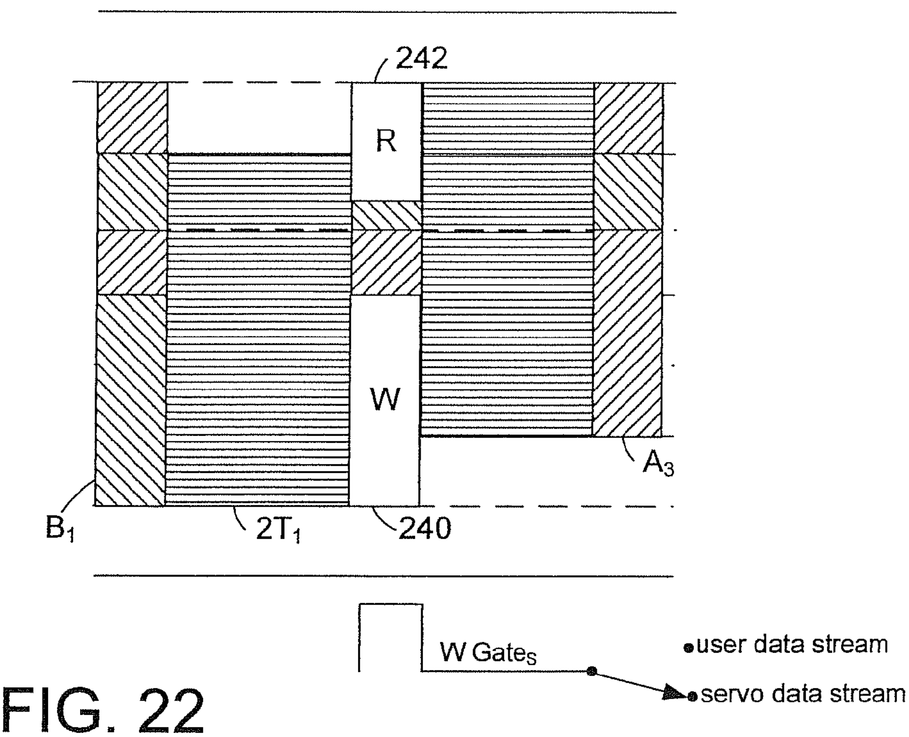

In FIG. 22 the disc 106 has rotated further during the fourth pass to where the transducer 104 is disposed at the second of the three servo wedges 130. The controller 176 asserts a write gate on the servo write channel 188 to produce a servo data stream through the multiplexer 198 and to each of the write elements 240 to store the $B_2$ servo burst.

Figure 23:
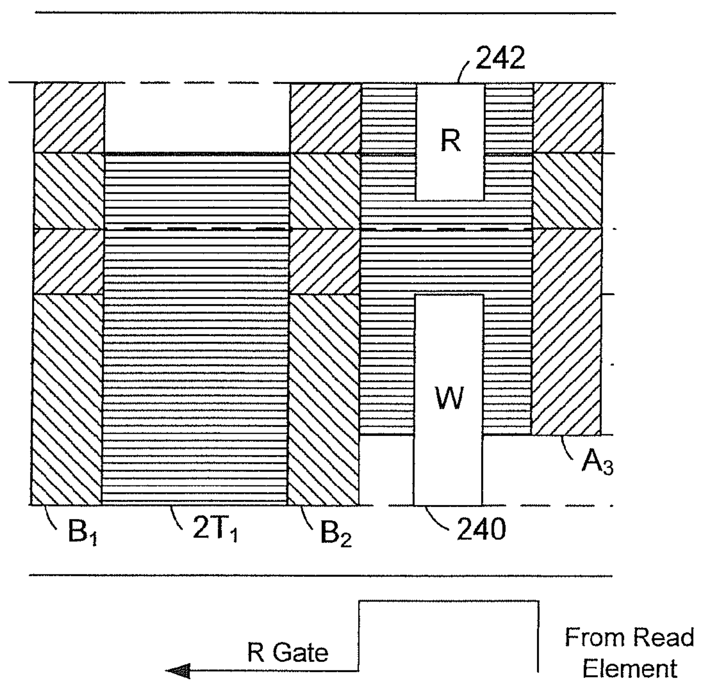

In FIG. 23 the disc 106 has rotated further during the fourth pass to where the transducer 104 is disposed at the second user data wedge 136. The controller 176 asserts a read gate on each of the read channels 172 to transduce a readback signal from the previously stored $2T_2$ data. The read channels 172 filter and sample the respective readback signals for indications of media flaws. The flaw scan controller 171 records the indications of flaws and the flaw scan processor 173 makes qualitative decisions about the discs 106 with respect to the number or the number and location of the indicated flaws.

Recapping, FIG. 11 depicts how the servowriter/certifier apparatus 100 uses the timing reference 178 to acquire phase lock with the moving storage media 106. The controller 176 executes programming instructions stored in memory 250 that are responsive to the timing reference 178 in interleaving the servo data stream202 and the user data stream 200 to form the write signal 204. The write signal204 is communicated to all of the preamplifiers 182 simultaneously. The write signal 204 stores a full complement of position servo bursts to the media 106 for a given servo track during only one complete pass of the media. By "full complement" it is meant that position servo bursts are stored to all servo wedges 130 (FIG. 4) of the track to which the write element 240 (FIG. 16) is aligned. In other words, all the A bursts in a servo track are written during one complete pass (one complete revolution) of the disc 106. Likewise, all the B bursts are stored to the adjacent servo track during the next complete pass.

In addition to asserting write gates to store all A bursts to a first servo track during a first pass and to store all B bursts to a second servo track during a second pass, the controller 176 also asserts a read gate to retrieve readback data from all user data wedges of a data track during the same time that the A bursts and B bursts are stored to the first and second servo tracks.

For example, in FIG. 22 the write element 240 is periodically storing the B servo bursts. Also, during a first pass of the disc 106 the write element 240 stores the 2T pattern after the $B_1$ servo burst, and subsequently in FIG. 23 the read element 242 transduces a readback signal from the previously stored 2T data after the $B_2$ servo burst.

It is understood that the transducer 104 next indexes to align the write element 240 with the servo sector seam at the centerline of the next data track $134_3$. During the next pass the write element 240 stores the A servo bursts and again alternates between reading user data with the read element 242 and storing user data with the write element 240 after each servo burst. Particularly, the pattern of alternating between storing user data and retrieving user data during the second pass is opposite to that performed during the first pass, regardless of the pattern during the first pass, so that ultimately user data is stored to all user data wedges in the first radial position (write element 240 position) and readback signals are transduced from all user data wedges in the second radial position (read element 242 position).

However, in equivalent alternative embodiments the interleaving the servo data stream and the user data stream can be by either entirely storing user data at the first radial position or entirely retrieving the previously stored user data from all user data wedges during the first pass of the disc 106. On the second pass the opposite process is performed, so that ultimately user data is stored to all user data wedges in the first radial position (write element 240 position) and readback signals are transduced from all user data wedges in the second radial position (read element 242 position).

The media servowriter/certifier apparatus 100 advantageously employs a communication circuit 156 (FIG. 8) having a read channel 172 that matches read channel parameters of a data storage device 100' (FIG. 7) ultimately using the media 106. In reconfiguring the media servowriter/certifier apparatus 100 for different data storage devices 100', the read channel 172 can be provided on the daughter card 230 (FIG. 15) that is swappable on the control board 108, or in alternative equivalent embodiments the read channel 172 can be configurable by executing software/firmware routines.

The read channel 172 is capable of sampling the readback signal from the transducer 104 and comparing sampling values to predetermined threshold values 181 (FIG. 6) that associate characteristics of the readback signal with a presence of a flaw in the media. The location of an indicated flaw can be recorded in terms of the servo data that was stored immediately preceding the indication of the flaw.

The present embodiments are adaptable to processing a plurality of discs 106 simultaneously. In order to minimize the processing cycle time, the storing servo data steps and the storing user data steps by the write element 240 (FIG. 16) are performed by sending a write signal to each of the dedicated preamplifiers 182 (FIG. 11) simultaneously. Each preamplifier 182 is part of a dedicated read channel 172 for processing each of the plurality of readback signals simultaneously.

The present embodiments permit using the media servowriter/certifier apparatus 100 to concurrently store servo data and user data to and retrieve user data from a media that is destined for use in a particular first product. The media servowriter/certifier 100 can then be reconfigured in order to concurrently store servo data and user data to and retrieve user data from another media that is destined for use in a particular second product that is characteristically different than the first product.

Generally, the disclosed embodiments contemplate a method including steps of mounting a storage media and a data transfer member for selective movement with respect to each other in a data transfer relationship, and processing the storage media by steps for certifying while servowriting that interleave streams of servo data and user data and store the interleaved stream at a first location of the storage media, while retrieving previously stored user data from a second location of the storage medium, wherein a full complement of the user data is retrieved from the second location within a timeframe during which a full complement of the servo data is stored to the first location in a minimum possible number of passes between the storage media and the data transfer member.

For purposes of this disclosure and meaning of the appended claims the term "steps for certifying while servowriting" includes the disclosed methods and equivalents thereof that are capable of interleaving servo data and user data in order to write a full complement of servo data in a minimum possible number of passes while simultaneously performing a 100% media certification. By 100% certification it is meant that readback data from each of the user data wedges is processed to determine whether flaws exist. As set forth above, for example, the minimum number of passes is two for writing an AB servo pattern to all the servo wedges of a track, so the 100% media certification is accordingly performed within two passes for each track in that case in accordance with the claimed embodiments. The term "means for certifying while servowriting" expressly does not include previously attempted solutions that either require more than the minimum possible number of passes to write the full complement of servo data or that perform less than a 100% media certification. Also as set forth above, "interleaving" the servo data and user data can mean that user data is written to all user data wedges during one pass and that readback data is retrieved from all user data wedges in another pass, or it can mean that the user data is stored to some of the user data wedges and readback data is retrieved from other of the user data wedges during each of both passes.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary in type or arrangement without departing from the spirit and scope of the present invention.

In addition, although the embodiments described herein are directed to illustrative embodiments describing data storage discs and disc drives using them, it will be appreciated by those skilled in the art that the claimed subject matter is not so limited and various other systems can utilize the present embodiments without departing from the spirit and scope of the claimed invention.

What is claimed is:

1. A method of operating a servo writing device, comprising:

storing discrete sets of servo data with a write element at a first radial location of a media; and during the storing discrete sets of servo data step for one rotational pass of the media and in intervals of time between storing adjacent pairs of the sets of servo data, performing one of:

storing user data with the write element at the first radial location of the media; and retrieving user data with a read element, offset from the write element, at a second radial location of the media, wherein the user data at the second radial location was previously stored by the write element before repositioning the write element to the first radial location.

2. The method of claim 1 wherein during a first rotational pass of the media the performing step comprises alternating between the storing user data step and the retrieving user data step.

3. The method of claim 2 wherein the first radial location aligns the write element with a first servo track in a first data track, and the second radial location is associated with a second data track different than the first data track, the method further comprising:

repositioning the write element to align with a second servo track in the first data track;

storing second discrete sets of servo data to the media with the write element; and during the storing second discrete sets of servo data step and in intervals of time between storing adjacent pairs of the second sets of servo data during a second rotational pass of the media, alternating between the storing user data step and the retrieving user data step.

4. The method of claim 1 further comprising identifying one or more flaws existing in the media from the retrieving user data step.

5. The method of claim 4 further comprising identifying respective locations of the flaws.

6. The method of claim 5 further comprising qualitatively characterizing the media with respect to at least one of a number of the flaws and locations of a plurality of the flaws.

7. The method of claim 6 wherein the qualitatively characterizing step is characterized by comparing samples of a readback signal obtained from the retrieving user data step against a predetermined threshold value.

8. The method of claim 7 wherein the qualitatively characterizing the media step is simultaneously performed with respect to each of a plurality of media.

9. The method of claim 6 wherein the qualitatively characterizing step is characterized by comparing a predetermined threshold to at least one of:

the number of the flaws in consecutive tracks and in a common wedge of the media; and the number of the flaws in consecutive wedges and in a common track of the media.

10. The method of claim 1 wherein the storing and retrieving steps are performed with respect to each of a plurality of media simultaneously.

11. The method of claim 1 wherein the storing and retrieving steps are characterized by a first bit density in a first zone of the media and by a different second bit density in a second zone of the media.

12. The method of claim 1 wherein the storing steps are characterized by multiplexing a user data stream and a servo data stream.

13. The method of claim 1 wherein the storing and retrieving steps are characterized by asserting read gates and write gates in relation to a timing reference in phase lock with the moving media.

14. The method of claim 1 wherein the retrieving step is characterized by read channel parameters that match a data storage device operably adapted for employing the media.

15. The method of claim 14 wherein the retrieving step is characterized by changing the read channel parameters to match a different data storage device operably adapted for employing the media.

16. The method of claim 15 wherein the changing step is characterized by swapping out a daughter integrated circuit card.

17. The method of claim 1 wherein the performing step during a first rotational pass of the media comprises one of:

storing user data to all user data wedges at the first radial location; and retrieving user data from all user data wedges at the second radial location.

18. The method of claim 17 wherein the first radial location aligns the write element with a first servo track in a first data track, and the second radial location is associated with a second data track different than the first data track, the method further comprising:

repositioning the write element to align with a second servo track in the first data track;

storing second discrete sets of servo data to the media with the write element; and during the storing second discrete sets of servo data step and in intervals of time between storing adjacent pairs of the second sets of servo data during a second rotational pass of the media, performing one of:

storing user data to all the user data wedges with the write element; and retrieving user data from all the user data wedges with the read element.

19. A method of operating a servo writing device comprising:

aligning a data transfer member to a first servo track in a first data track of a storage media;

storing first servo bursts with the data transfer member in all servo wedges at the first data track during a first rotational pass of the storage media;

aligning the data transfer member to a second servo track in the first data track;

storing second servo bursts with the data transfer member in all the servo wedges at the first data track during a second rotational pass of the storage media; and retrieving user data with the data transfer member from all user data wedges at a second data track different than the first data track during the storing steps, the user data having been previously stored by the data transfer member.

20. The method of claim 19 further comprising storing user data to the first data track with the data transfer member during at least one of the first and second rotational passes.

21. The method of claim 20 characterized by a selected one of:

interleaving the storing user data step and the retrieving user data step during each of the rotational passes; and performing only the storing user data step during one rotational pass and only the retrieving user data step during the other rotational pass.

22. A method of operating a servo writing device comprising:

mounting a storage media and a data transfer member for selective movement with respect to each other in a data transfer relationship; and processing the storage media by steps for certifying while servowriting that interleave streams of servo data and user data and store the interleaved stream at a first radial location of the storage media, while retrieving previously stored user data from a second radial location of the storage media, wherein a full complement of the user data is retrieved from the second radial location within a timeframe during which a full complement of the servo data is stored to the first radial location in a minimum possible number of rotational passes of the storage media.

* * * * *